United States Patent [19]

Soka et al.

[11] Patent Number: 5,265,499
[45] Date of Patent: Nov. 30, 1993

[54] METHOD OF CONTROLLING SPEED CHANGES IN HYDRAULICALLY ACTUATED TYPE MULTIPLE-STAGE SPEED CHANGE GEAR

[75] Inventors: Kohei Soka; Kiyoshi Kaneko; Yasunori Okura; Takeo Kato, all of Kawasaki, Japan

[73] Assignee: Kabushiki Kaisha Komatsu Seisakusho, Tokyo, Japan

[21] Appl. No.: 876,700

[22] Filed: Apr. 29, 1992

Related U.S. Application Data

[63] Continuation of Ser. No. 499,439, Jun. 21, 1990, filed as PCT/JP89/01096, Oct. 25, 1989, abandoned.

[30] Foreign Application Priority Data

Oct. 27, 1988 [JP] Japan .................................. 63-269466
Nov. 18, 1988 [JP] Japan .................................. 63-291628

[51] Int. Cl.$^5$ .............................................. B60K 41/06
[52] U.S. Cl. ........................................ 74/878; 74/861; 74/866; 364/424.1
[58] Field of Search ............... 74/866, 878, 890, 861; 364/424.1

[56] References Cited

U.S. PATENT DOCUMENTS

| | | | |
|---|---|---|---|
| 3,752,009 | 8/1973 | Chana | 74/890 X |
| 3,805,640 | 4/1974 | Schneider et al. | 74/866 X |
| 4,208,929 | 6/1980 | Heino et al. | 74/866 X |
| 4,314,340 | 2/1982 | Miki et al. | 74/866 X |
| 4,335,428 | 6/1982 | Miki et al. | 74/866 X |
| 4,367,528 | 1/1983 | Kawamoto et al. | 74/866 X |
| 4,414,863 | 11/1983 | Heino | 364/424.1 |
| 4,486,838 | 12/1984 | Itoh et al. | 364/424.1 |
| 4,551,802 | 11/1985 | Smyth | 74/866 X |
| 4,574,925 | 3/1986 | Nishimura et al. | 74/878 X |
| 4,611,285 | 9/1986 | Weisman, II | 74/866 X |
| 4,697,474 | 10/1987 | Sumiya et al. | 74/890 |
| 4,698,763 | 10/1987 | Smyth | 364/424.1 |
| 4,730,519 | 3/1988 | Nakamura et al. | 74/866 |
| 4,753,135 | 6/1988 | Sotoyama et al. | 74/866 |
| 4,771,853 | 9/1988 | Nishikawa | 74/878 X |
| 4,825,372 | 4/1989 | Yasue et al. | 364/424.1 X |
| 4,945,482 | 7/1990 | Nishikawa et al. | 74/878 X |
| 4,962,679 | 10/1990 | Ishikawa et al. | 74/866 |
| 5,010,490 | 4/1991 | Naito et al. | 364/424.1 X |
| 5,048,373 | 9/1991 | Sumimoto et al. | 74/866 |
| 5,097,725 | 3/1992 | Sawa | 74/866 |
| 5,122,956 | 6/1992 | Satoh et al. | 74/866 X |
| 5,150,297 | 9/1992 | Daubenmier et al. | 74/866 X |
| 5,157,608 | 10/1992 | Sankpal et al. | 74/866 X |
| 5,172,609 | 12/1992 | Nitz et al. | 74/861 X |

FOREIGN PATENT DOCUMENTS

| | | |
|---|---|---|
| 58-37368 | 3/1983 | Japan . |
| 58-81256 | 5/1983 | Japan . |
| 58-211061 | 12/1983 | Japan . |
| 2-35261 | 2/1990 | Japan .................................. 74/878 |

Primary Examiner—Leslie A. Braun
Assistant Examiner—David E. Henn
Attorney, Agent, or Firm—Armstrong, Westerman, Hattori, McLeland & Naughton

[57] ABSTRACT

A method of controlling speed changes in a hydraulically actuated type multiple-stage speed change gear, which renders it possible to prevent the occurrence of "shift hunting" without impairing the acceleration characteristics of the vehicle and also reduce the magnitude of shocks which occur at the time of speed changes even in case hydraulic clutches of small capacity are used. According to this method of controlling speed changes, a controller (30) is used to conduct speed changes when conditions for speed changes, i.e., upshift/downshift are satisfied, and in cases where a downshift is made after an upshift and an upshift is made after a downshift, speed changes are conducted after the lapse of a long speed change inhibiting time, and in other cases than the aforementioned, speed changes are conducted after the lapse of a short speed change inhibiting time. Further, only in case the vehicle is decelerated from a high speed stage to a coasting speed, deceleration operations are conducted with a direct coupled clutch (8) of the torque converter (3) kept in engaged condition, and in other cases than the aforementioned, speed changes are conducted with the direct coupled clutch kept in released condition.

3 Claims, 8 Drawing Sheets

METHOD OF CONTROLLING SPEED CHANGES IN HYDRAULICALLY ACTUATED TYPE MULTIPLE-STAGE SPEED CHANGE GEAR

This application is a continuation of application Ser. No. 07/499,439 filed Jun. 21, 1990, filed as PCT/JP89/01096, Oct. 25, 1989, now abandoned.

TECHNICAL FIELD OF THE INVENTION

The present invention relates to a method of controlling speed changes in a speed change gear, and more particularly to a method of controlling speed changes in a hydraulically actuated type multiple-stage speed change gear for use in a large-sized construction vehicle.

BACKGROUND ART OF THE INVENTION

There has so far been known and used a speed change gear comprising a group of clutches comprised of a plurality of speed stage clutches, and forward/reversing clutches, and a group of valves comprised of valves for speed stages for selectively supplying pressurized fluid into these clutches and valves for driving in forward and reverse. A valve for any selected one of speed stages and the valve for forward running or the valve for reversing are changed over so as to put the clutch for the selected speed stage and either the forward running clutch or the reversing clutch, respectively, in engaged condition, thereby changing the speed change gear to any desired speed stage.

This speed change gear is arranged to control speed changes of the vehicle as described below.

Stating in brief, the arrangement is made such that the vehicle speed and the degree of opening of the accelerator, etc. are input to a controller. The controller compares a vehicle speed $V_1$ set at each speed stage with the actual vehicle speed $V_0$, and outputs a downshift command in case $V_1$ is more than $V_0$ and output an upshift command in case $V_1$ is less than $V_0$ so as to disengage or release the presently engaged clutch and then engage a clutch corresponding to the next speed stage, thereby automatically changing the vehicle speed.

Such a method of controlling speed changes is arranged to upshift or downshift the vehicle when conditions for upshifting or downshifting are met. Depending on running conditions of the vehicle, traction load increases or decreases suddenly so that conditions for upshifting and those for downshifting are met repeatedly for a short time thereby causing repetition of upshifts and downshifts for a short time, so-called "shift hunting" which results in unstable control of speed changes.

To solve this problem, it is only necessary to provide, after completion of speed change operations, an appropriate time lag from the time when conditions for upshifting or downshifting are met until an upshifting command or a downshifting command is output.

Stating more specifically, to eliminate the shift hunting, it is only necessary to inhibit the speed change gear from conducting any speed change until a preset time has passed after completion of speed change operations, even though the above-mentioned conditions for upshifting or downshifting are met. This preset time is referred to as speed change inhibiting time.

However, if the speed change inhibiting time is too long, then an extended period of time is needed from the time when conditions for a speed change are met until completion of the speed change. As a result, upon starting and accelerating the vehicle, a longer time is required to upshift (or increase the speed of) the vehicle causing poor acceleration, while if the speed change inhibiting time is kept short, then an improved acceleration is obtained, but the abovementioned shift hunting is liable to occur.

Further, there is known a hydraulically actuated type multiple-stage speed change gear comprising a plurality of hydraulic clutches and gear trains, and arranged such that a speed change of the gears trains to a predetermined speed stage can be conducted by operating or engaging a predetermined clutch.

Such a hydraulically actuated multiple-stage speed change gear is used in combination with a torque converter to increase the tractive force available when the vehicle is started.

Since a large-sized construction vehicle, for example a large-sized dumptruck, is required to run at a high speed, a torque converter fitted with a direct coupled clutch which connects pump impellers and turbine blades thereof is used so as to render the direct coupled clutch on when the vehicle is running to enable a high torque to be transmitted efficiently. However, controls of speed changes are made such that at the time of a speed change the direct coupled clutch is rendered off and the load on the hydraulic clutch of the speed change gear is reduced by the torque converter, and after completion of the speed change the direct coupled clutch is rendered on, or engaged.

More specifically, if a speed change of the gear trains is made with the direct coupled clutch kept on, then a high load is exerted on the hydraulic clutch thus increasing shocks due to the speed change. Therefore, at the time of a speed change, the direct coupled clutch is rendered off to reduce the load exerted on the hydraulic clutch thereby reducing shocks due to the speed change.

According to such a method of controlling speed changes, at the time of speed change both speed change shocks due to engagement of the hydraulic clutch and those due to engagement of the direct coupled clutch will occur so as to increase the magnitude of shocks which occur at the time of the speed change, thus transmitting unpleasant jolts to the driver and passengers.

Furthermore, if the capacity of the hydraulic clutch is increased, then the load exerted on the hydraulic clutch when it is rendered on can be reduced to some degree, however, the speed change gear becomes larger and more expensive than necessary.

SUMMARY OF THE INVENTION

The present invention has been made in view of the above-mentioned circumstances in the prior art, and has for its object to provide a method of controlling speed changes in a hydraulically actuated type multiple-stage speed change gear, which renders it possible to prevent the occurrence of shift hunting without impairing the acceleration characteristics.

Further, another object of the present invention is to provide a method of controlling speed changes in a hydraulically actuated type multiple-stage speed change gear, which renders it possible to reduce shocks that occur at the time of a speed change and also reduce the capacity of the hydraulic clutch.

To achieve the former object, according to a first aspect of the present invention, there is provided a method of controlling speed changes in a hydraulically actuated type multiple-stage speed change gear, arranged for conducting speed change operations when conditions for speed changes, i.e., upshift and downshift are met, characterized in that in cases where a downshift indicated by the controller just after an upshift has been made or an upshift is indicated by the controller just after a downshift has been made, a relatively long first shift inhibiting time is employed, whereas a second shift inhibiting time, shorter than the first, is employed in all other circumstances.

To achieve the latter object, according to a second aspect of the present invention, there is provided a method of controlling speed changes in a hydraulically actuated type multiple-stage speed change gear, characterized in that only in case the vehicle is downshifted from such a high speed that the speed change gear is in a high speed stage to a coasting speed, downshifting operations are conducted with a direct coupled clutch kept in an engaged condition. In other cases than the aforementioned, speed change operations are conducted with the direct coupled clutch kept in a released condition.

The present invention, incorporating the abovementioned aspect, has the following advantages:

In cases where a downshift is made after an upshift and an upshift is made after a downshift, repetition of upshifts and downshifts for a short time does not occur and therefore shift hunting does not occur, and therefore safe speed change controls can be achieved. In other cases than the aforementioned, speed changes are conducted after the lapse of a short speed change inhibiting time so that the upshift characteristics can be enhanced.

Further, only in case where the vehicle is downshifted from such a high speed that the speed change gear is in a high speed stage to a coasting speed, a downshift is made with the direct coupled clutch kept in engaged condition, and therefore shocks due to engagement of the direct coupled clutch do not occur, and also in that case the torque to be transmitted is low and the load exerted on the hydraulic clutches is low so that most of shocks which occur at the time of speed changes can be absorbed even by a hydraulic clutch of a small capacity.

Thus, not only shocks which occur at the time of speed changes can be reduced thereby reducing the jolts transmitted to the driver, but also in case the torque to be transmitted is high and the load applied to the hydraulic clutch at the time of a speed change is high, the speed change is conducted with the direct coupled clutch kept in released condition. Therefore, even if hydraulic clutches of a small capacity are used, the durability thereof can be secured.

Further, since the vehicle is downshifted with the direct coupled clutch of the torque converter kept in engaged condition, engine braking action can be utilized effectively so that the vehicle can be downshifted smoothly in a short time.

The above-mentioned and other objects, aspects and advantages of the present invention will become apparent to those skilled in the art from the following description and accompanying drawings, in which preferred embodiments incorporating the principles of the present invention are shown by way of example only.

BRIEF DESCRIPTION OF THE DRAWINGS

FIGS. 4 (1) and 4(2) are flow charts showing speed change controlling operations;

DETAILED DESCRIPTION OF PREFERRED EMBODIMENTS

The present invention will now be described below with reference to the accompanying drawings showing several embodiments of the present invention.

Figure 1:
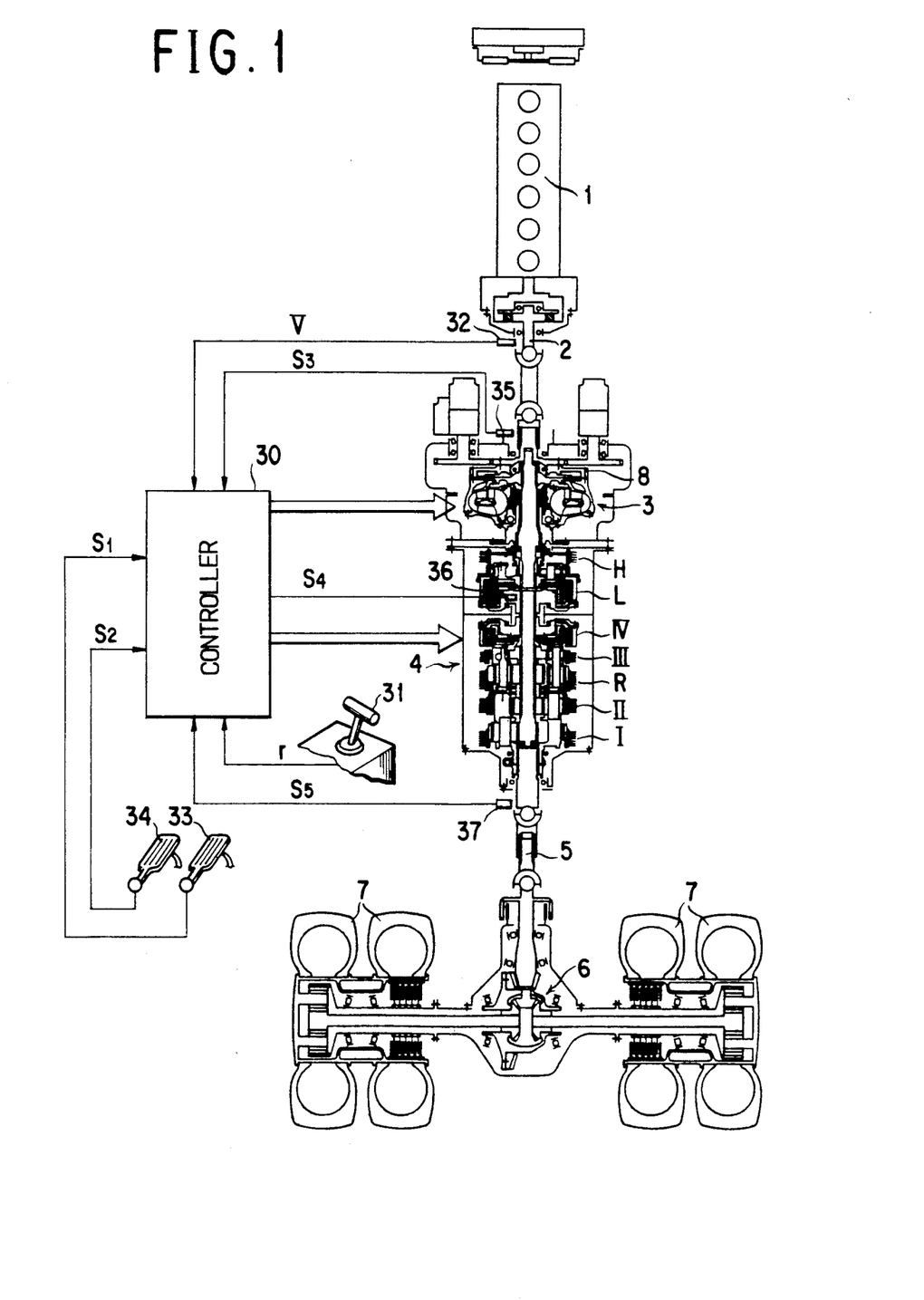
FIG. 1 is a schematic, configurational, explanatory view of a power transmission system of a construction vehicle in which a speed change controlling system circuit according to the present invention is incorporated.

An example of power transmission systems of construction vehicles is arranged as shown in FIG. 1. An output shaft 2 of engine 1 is connected to the input shaft of a torque converter 3 whose output shaft is connected to the input shaft of a hydraulically actuated type speed change gear 4, the output shaft of which is connected by way of a shaft 5 and a differential gear, etc. to the left and right drive wheels 7.

The above-mentioned torque converter 3 comprises a clutch 8 which directly couples the input and output shafts of a pump impeller and a turbine rotor, and the above-mentioned hydraulically actuated type multiple-stage speed change gear 4 comprises a high speed hydraulic clutch H, a low speed hydraulic clutch L, a fourth hydraulic clutch IV, a third hydraulic clutch III, a reversing hydraulic clutch R, a second hydraulic clutch II, and a first hydraulic clutch I. A variety of speed change operations given in TABLE I below can be made by selectively engaging or disengaging each of the hydraulic clutches.

TABLE I

| | SPEED STAGES | | | | | | | | |
| --- | --- | --- | --- | --- | --- | --- | --- | --- | --- |
| | FORWARD | | | | | | | REVERSING | |
| HYDRAULIC CLUTCHES | 1ST SPEED | 2ND SPEED | 3RD SPEED | 4TH SPEED | 5TH SPEED | 6TH SPEED | 7TH SPEED | 1ST SPEED | 2ND SPEED |
| II | | | | | ON | ON | ON | | ON |
| L | ON | ON | ON | ON | | | | ON | |
| IV | | | | ON | | | | | |
| III | | | ON | | | | ON | | |

TABLE I-continued

| HYDRAULIC CLUTCHES | SPEED STAGES | | | | | | | | |
|---|---|---|---|---|---|---|---|---|---|
| | FORWARD | | | | | | | REVERSING | |
| | 1ST SPEED | 2ND SPEED | 3RD SPEED | 4TH SPEED | 5TH SPEED | 6TH SPEED | 7TH SPEED | 1ST SPEED | 2ND SPEED |
| R | | | | | | | | ON | ON |
| H | | ON | | | | ON | | | |
| I | ON | | | | ON | | | | |

Figure 2:
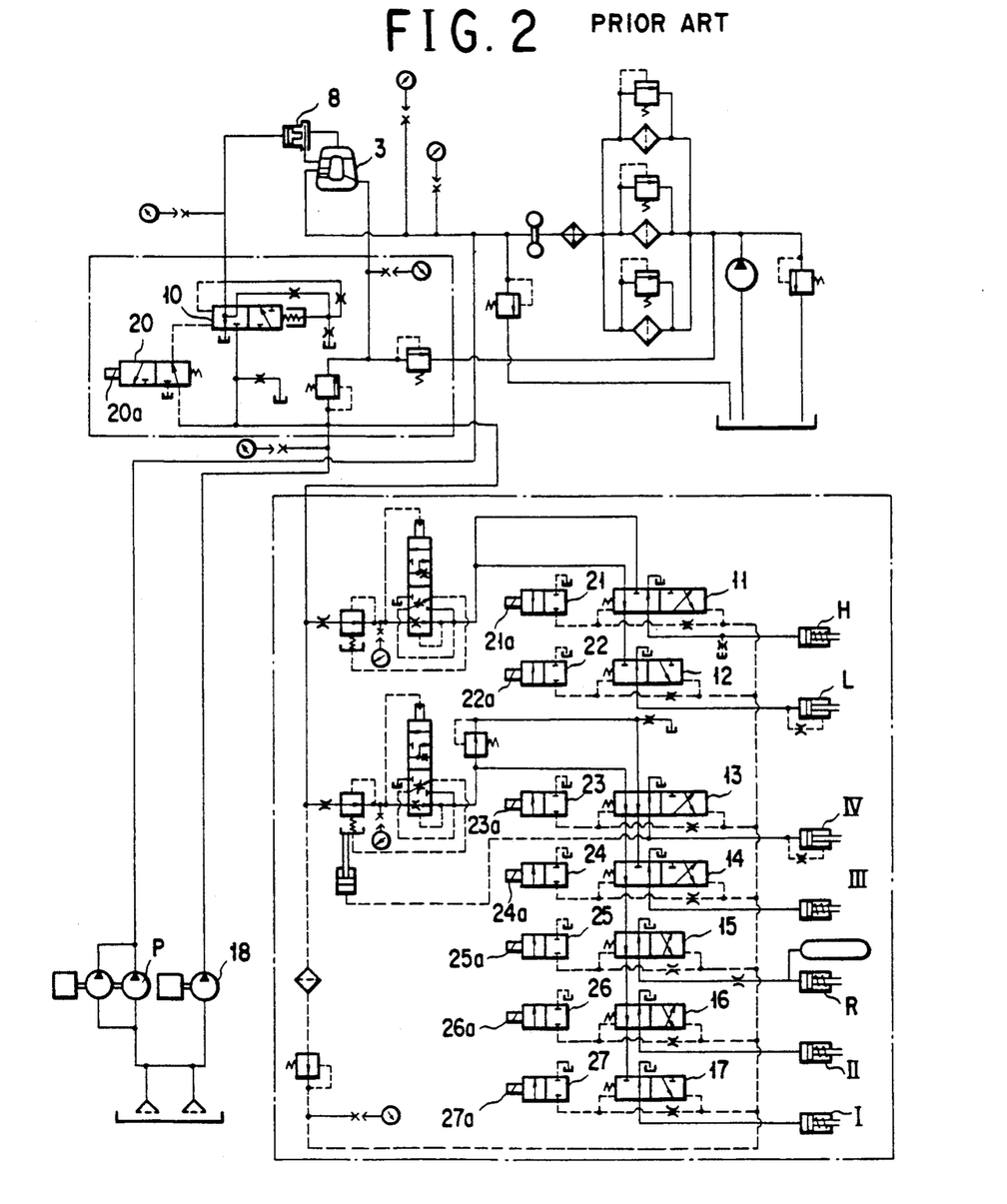
FIG. 2 shows a prior art example of a hydraulic circuit of a speed change gear.

As shown in FIG. 2, the supply of fluid under pressure discharged by a pump 18 into the abovementioned direct coupled clutch 8 is controlled by a valve 10 for use with the direct coupled clutch 8, whilst the supply of fluid under pressure discharged by the pump 18 into each of the hydraulic clutches of the speed change gear 4 is controlled by each of valve groups associated with the speed change clutches, i.e., a valve 11 for use with the high speed clutch, a valve 12 for use with the low speed clutch, a valve 13 for use with the fourth clutch, a valve 14 for use with the third clutch, a valve 15 for use with the reversing clutch, a valve 16 for use with the second clutch, and a valve 17 for use with the first clutch, respectively. The actuation of the valve 10 associated with the direct coupled clutch 8 is changed over by a first solenoid valve 20, and those of the valves associated with the other hydraulic clutches are changed over by a second solenoid valve 21, a third solenoid valve 22, a fourth solenoid valve 23, a fifth solenoid valve 24, a sixth solenoid valve 25, a seventh solenoid valve 26, and an eighth solenoid valve 27, respectively. Each of the solenoid valves 20 to 27 are each controlled in such a manner that when each of the solenoids 20a to 27a is energized each of the valve 10 associated with the direct coupled clutch 8 and the valves associated with the other hydraulic clutches are rendered ON or opened so that each of the clutch chamber is supplied with fluid under pressure discharged by the pump 18 thereby engaging each of the hydraulic clutches, respectively.

The above-mentioned configuration is publicly known, and therefore detailed description thereof is omitted herein.

Energization of the above-mentioned solenoids 20a and 27a is controlled by a controller 30 as shown in FIG. 1, and also input to the controller 30 are a speed stage signal (speed change positional signal) r from a gear-shifting lever 31, an engine speed signal V from a sensor 32 sensing the number of revolutions of the engine 1 (signal indicative of the number of revolutions of the engine) from which vehicle speed is determined, an acceleration OFF signal $S_1$ from an acceleration sensor 33, a brake OFF signal $S_2$ from a brake pedal 34, a speed change gear input revolution signal $S_3$ from a first revolution sensor 35, an intermediate shaft revolution signal $S_4$ from a second revolution sensor 36 and an output shaft revolution sensor $S_5$ from a third revolution sensor 37, etc. The arrangement is made such that when predetermined conditions for a speed change are met the controller 30 will output a speed change command to any appropriate two pieces out of the solenoids 20a to 27a.

Figure 4:
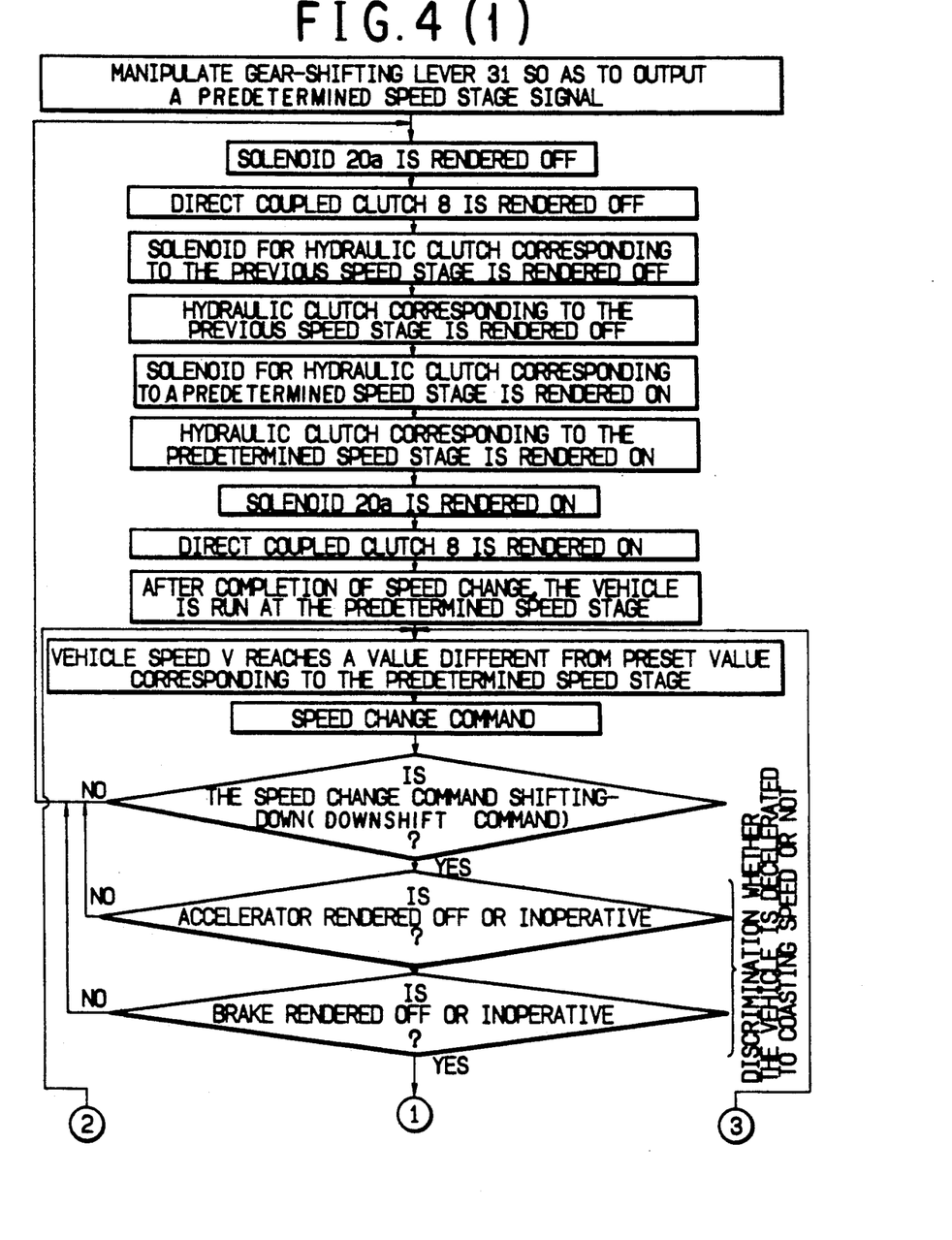

Speed controls according to a first aspect of the present invention are shown in the flow chart in FIG. 4.

Figure 5:
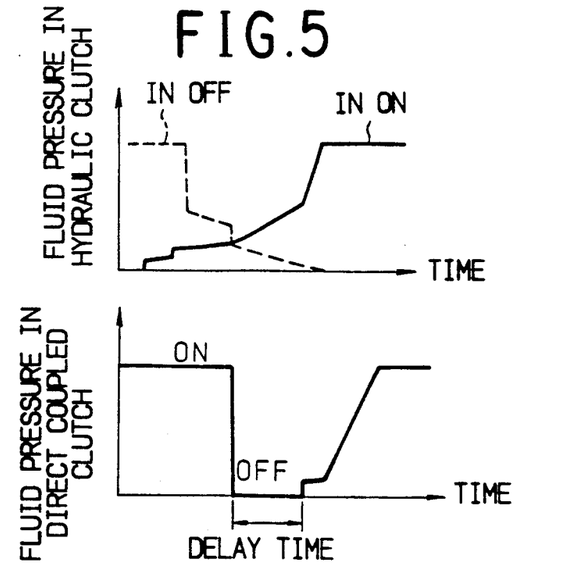
FIG. 5 consists of graphs showing changes in fluid pressure in a hydraulically actuated clutch and a direct coupled clutch, respectively.

In the flow chart shown in FIG. 4, ON/OFF controls of the solenoid 20a are made such that simultaneously with the transmission of a speed change command a delay timer is actuated so as to cause increases and decreases in fluid pressure in the hydraulic clutches and the direct coupled clutch 8 as shown in FIG. 5.

Stating in brief, in case it is desired to downshift the vehicle from such a high speed that the speed change gear is in any high speed stage between the seventh speed and the fourth speed, for example, to a coasting speed which is attainable by rendering the accelerator and the brake OFF, the speed change gear can be downshifted with the direct coupled clutch 8 kept in engaged condition, and also when it is desired to downshift the vehicle from such a low speed that the speed change gear is in any low speed stage such as for example, the third or second speed to a coasting speed, the speed change gear can be downshifted with the direct coupled clutch 8 kept in disengaged condition.

Figure 3:
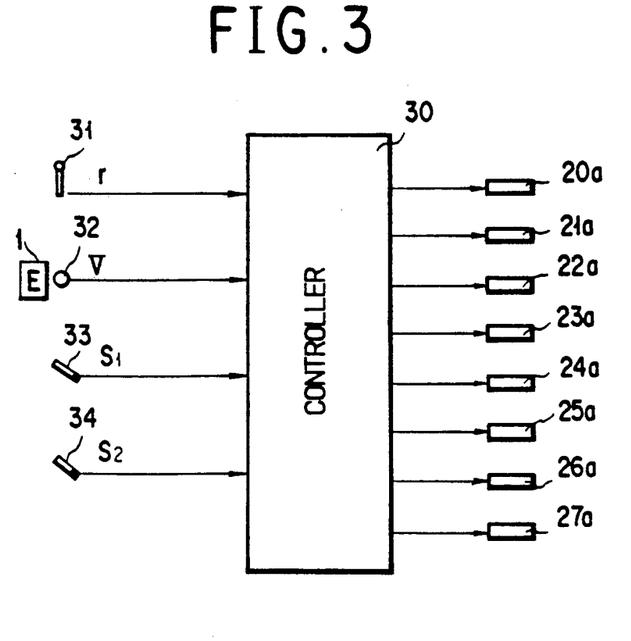
FIG. 3 is a schematic, block diagram showing another embodiment of the speed controlling system circuit.

Further, in the speed control according to this first aspect, it is not necessary to input the abovementioned signals $S_3$, $S_4$ and $S_5$ to the controller 30, as can be seen from FIG. 3.

In the next place, a second aspect of the speed control according to the present invention will be described with reference to FIGS. 6 to 8.

Figure 6:
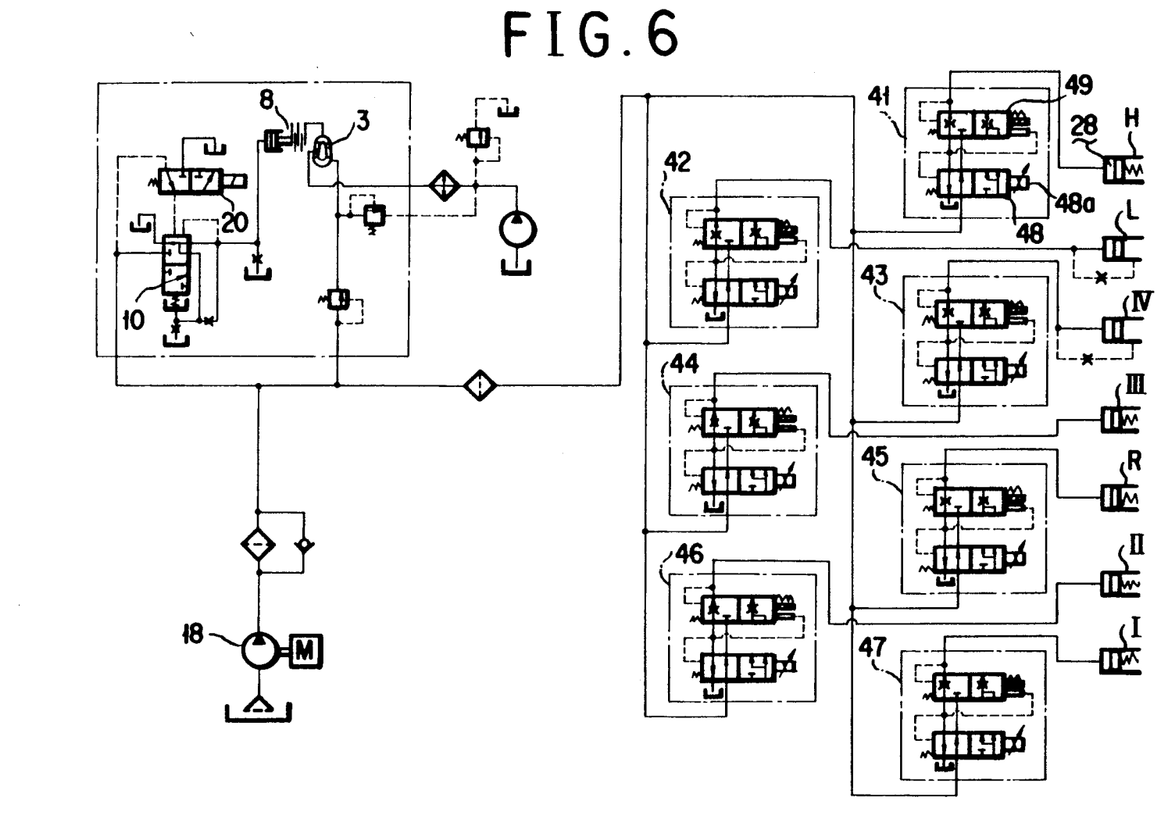
FIG. 6 shows another embodiment of the hydraulic circuit of the speed change gear.

FIG. 6 shows another embodiment of the hydraulic control circuit of the hydraulically actuated type speed change gear. The hydraulic control circuit shown in FIG. 6 comprises a valve 41 for use with the high speed hydraulic clutch H, a valve 42 for use with the low speed hydraulic clutch L, a valve 43 for use with the fourth hydraulic clutch IV, a valve 44 for use with the third hydraulic clutch III, a valve 45 for use with the reversing hydraulic clutch R, a valve 46 for use with the second hydraulic clutch II, and a valve 47 for use with the first hydraulic clutch I, each of the valves serving to selectively supply pressurized fluid discharged by the pump 18 into its associated clutch. Each of these valves for the hydraulic clutches comprises a pressure control valve 48 and a flow rate control valve 49.

The pressure control valve 48 is adapted to control the fluid pressure by the electric current supplied to a proportional action solenoid 48a. The proportional action solenoid 48a is supplied with electric current from the above-mentioned controller 30.

The above-mentioned flow rate control valve 49 is actuated by a trigger from the pressure control valve 48 and is kept in communicating condition until the clutch's pressure chamber 28 is filled with fluid under pressure. At the same time when the pressure chamber 28 becomes full of pressurized fluid, the flow rate control valve 49 is disconnected and will transmit to the controller 30 a signal indicating that the chamber 28 is filled with pressurized fluid. When a fluid pressure is applied to the clutch pressure chamber 28, the flow rate control valve 49 continues to transmit to the controller 30 a signal indicating that the clutch chamber is filled with fluid under pressure, thereby indicating the presence of fluid pressure therein.

Figure 7A:
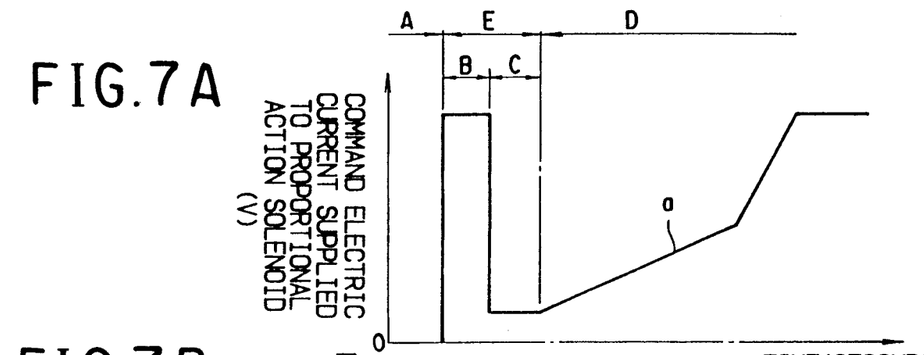
FIGS. 7A, 7B and 7C are graphs showing relationships between the command value of electric current through a proportional action solenoid, the pressure in a clutch chamber, and the signal output transmitted when the clutch chamber is filled with fluid, respectively as the ordinate, and the time as the abscissa.
Figure 7B:
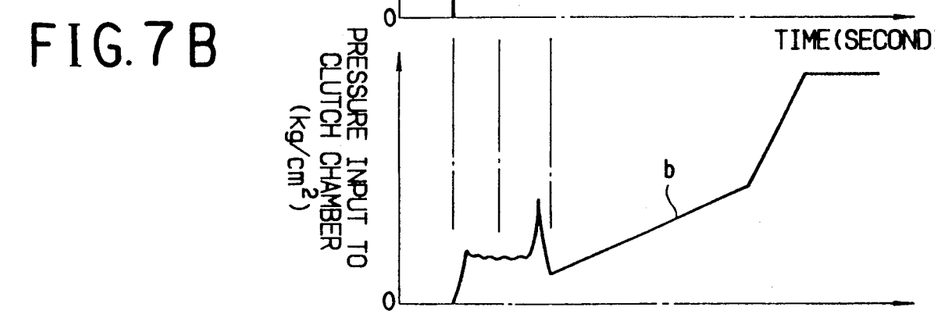
Figure 7C:
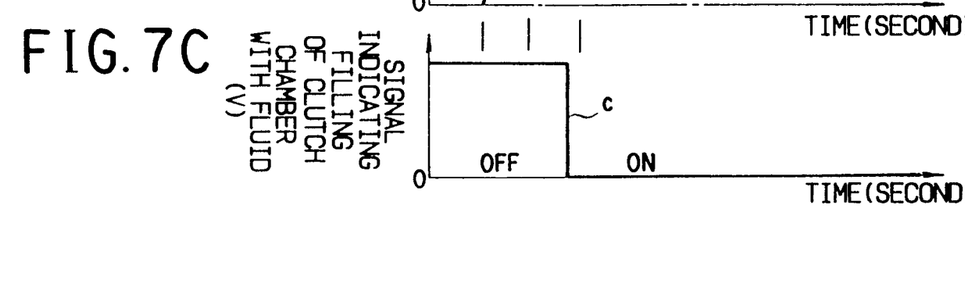
Figure 8:
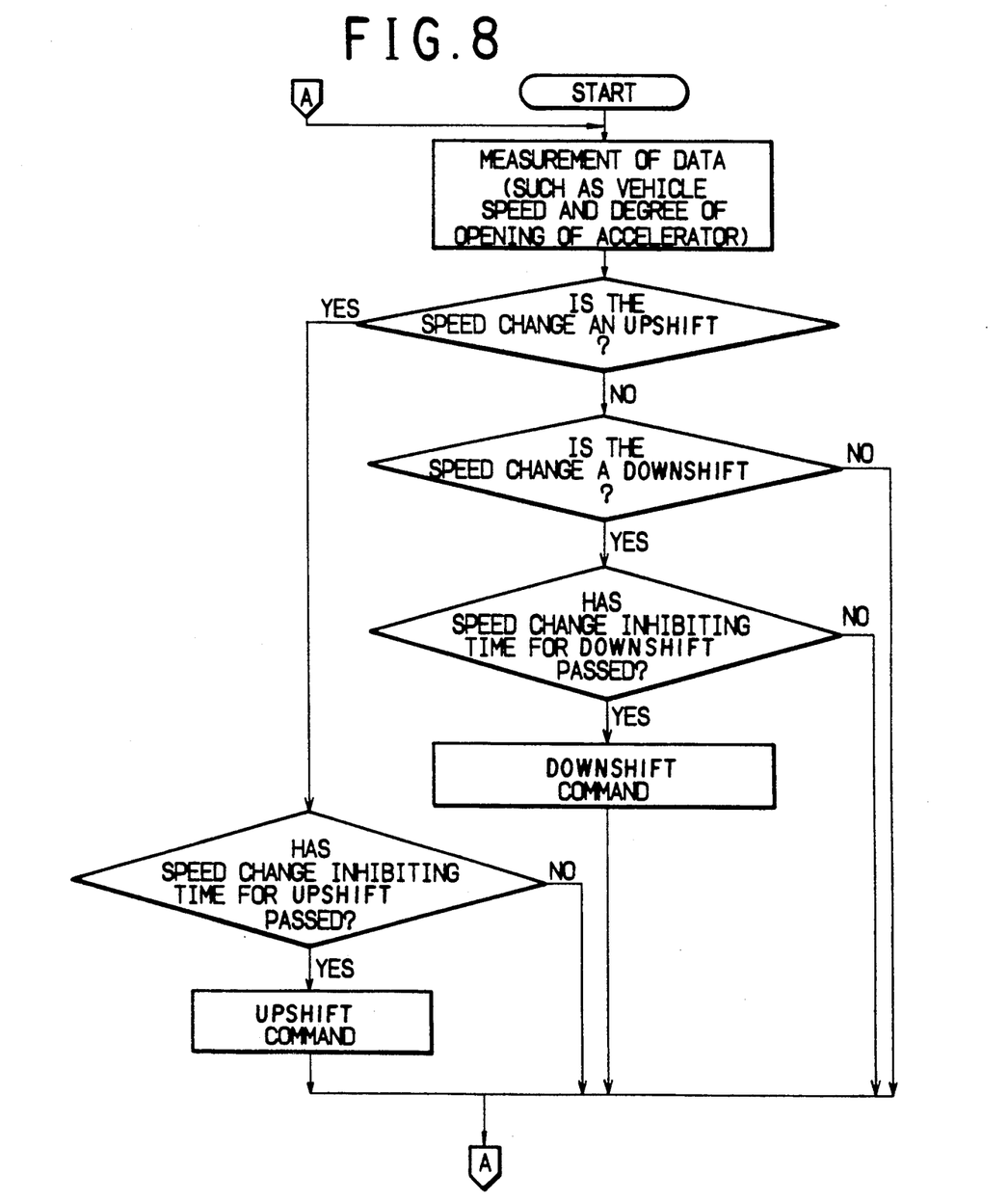
FIG. 8 is another flow chart showing speed change controlling operations.

The command electric current supplied to the above-mentioned proportional action solenoid 48a is controlled as shown in FIG. 7A, and the fluid pressure in the clutch chamber 28 varies as shown in FIG. 7B, while the signal indicating the completion of filling the clutch chamber with pressurized fluid is rendered ON and OFF as shown in FIG. 7C.

In FIGS. 7A, 7B and 7C, reference character A denotes values before speed change (when fluid in the clutch chamber 29 is drained), B denotes values when filling of the clutch chamber 28 with pressurized fluid is commenced (during triggering), C denotes values when the clutch chamber has been filled with fluid, D denotes values when the fluid pressure in the clutch chamber is gradually increasing, and E denotes values when the clutch chamber is being filled with pressurized fluid.

When a forward first speed command is output by the controller 30, the valve 42 for use with the low speed hydraulic clutch and the valve 47 for use with the first speed hydraulic clutch are each supplied with a command electric current so that the low speed hydraulic clutch L and the first speed hydraulic clutch I, respectively, are rendered operative or engaged thereby changing Other speed change operations are made in the like manner as indicated in the above-mentioned TABLE I.

In the next place, the method of controlling speed changes according to the second aspect will be described.

If conditions for upshift are met when the vehicle is running at a predetermined speed stage, then the controller 30 will discriminate whether the previous speed change was an upshift or a downshift, and in case it is upshift, output an upshift command after a short speed change inhibiting time, while in case it is downshift, output an upshift command after a long speed change inhibiting time.

In the same manner, if conditions for downshift are met when the vehicle is running at a predetermined speed stage, then the controller 30 will discriminate whether the previous speed change was a downshift or an upshift, and in case it was a downshift output a downshift command after a short speed change, inhibiting time, while in case it is upshift, output a downshift command after a long speed change inhibiting time.

The above-mentioned speed controls are tabulated in the following table II and shown in the form of a flow chart in FIG. 8.

TABLE II

| | SPEED CHANGE INHIBITING TIME UNIT:SECOND | |
|---|---|---|
| | IN CASE OF UPSHIFT | IN CASE OF DOWNSHIFT |
| AFTER $F_1 \to F_2$ | 0.2 | 1.87 |
| AFTER $F_2 \to F_3$ | 0.2 | 1.33 |
| AFTER $F_4 \to F_5$ | 0.2 | 1.91 |
| AFTER $F_5 \to F_6$ | 0.2 | 1.91 |
| AFTER $F_6 \to F_7$ | 0.2 | 1.91 |
| AFTER $F_2 \to F_1$ | 1.10 | — |
| AFTER $F_3 \to F_2$ | 2.23 | 0.2 |
| AFTER $F_4 \to F_3$ | 0.69 | 0.2 |
| AFTER $F_5 \to F_4$ | 2.23 | 0.2 |
| AFTER $F_6 \to F_5$ | 2.23 | 0.2 |
| AFTER $F_7 \to F_6$ | 2.23 | 0.2 |

As mentioned above, in case a downshift is made after an upshift (for example, $F_1 \to F_2 \to F_1$) and also in case an upshift is made after a downshift (for example, $F_3 \to F_2 \to F_3$), the speed change inhibiting time is kept long thereby preventing the occurrence of shift hunting, while the speed change inhibiting time when conducting other speed changes is kept short so that the upshift characteristics of the vehicle can be enhanced.

In case speed controls are made as mentioned hereinabove using the above-mentioned valves for use with the hydraulic clutches each comprising a pressure control valve 48 and a flow rate control valve 49, upon effecting a speed change by engaging and disengaging one and the same clutch as in the cases of an upshift after a downshift, and deceleration after an upshift, the fluid in the clutch chamber of one clutch is not completely drained, which results in filling of the clutch chamber with pressurized fluid during triggering, thus causing sudden increase in fluid pressure in the clutch chamber instead of gradual increase so as to engage the clutch thereby bringing forth such disadvantages as the occurrence of large shocks due to speed changes and damage of the clutch. However, the above-mentioned disadvantages can be eliminated by keeping the speed change inhibiting time long as mentioned above to enable the fluid in the clutch chamber to be drained completely.

In case a speed change is made, for example, from the forward second speed (the second speed clutch and the low speed clutch are rendered operative) to the forward third speed (the second speed clutch and the high speed clutch are rendered operative) and back to the forward second speed (the second speed clutch and the low speed clutch are rendered operative), the low speed clutch is engaged and disengaged, and therefore if the speed change inhibiting time is kept short, then a speed change command is input when the fluid in the clutch chamber of the low speed clutch is not completely drained, thus causing the clutch chamber to be filled with pressurized fluid during triggering so as to cause sudden increase in fluid pressure in the clutch chamber instead of gradual increase.

In contrast therewith, if the speed change inhibiting time is kept long, then a speed change command is input after the fluid in the clutch chamber has been completely drained, so that the fluid pressure in the clutch chamber can be increased gradually.

What is claimed is:

1. A method of controlling speed ratio changes in hydraulically actuated type multiple-stage speed ratio change gear, arranged for conducting speed ratio change operations when conditions for speed ratio changes in the form of upshifts and downshifts are met, comprising the steps of:

determining when a first shifting condition occurs wherein a downshift is indicated by a controller just after an upshift has been made or an upshift is indicated by the controller just after a downshift has been made;

delaying speed ratio change operations until after the lapse of a relatively long first shift inhibiting time when said first shifting condition has occurred; and delaying speed ratio change operations until after the lapse of a second shift inhibiting time which is shorter than said first shift inhibiting time, when a shifting condition other than said first shifting condition has occurred.

2. A method of controlling speed ratio changes in a hydraulically actuated type multiple-stage speed ratio changes in a hydraulically actuated type multiple-stage speed ratio change gear as claimed in claim 1, further comprising the steps of:

determining when a second shifting condition occurs, said second shifting condition being when the vehicle is decelerated from such a high speed that the second change gear is in a high speed stage, to a coasting speed, wherein said hydraulically actuated type multiple-stage speed change gear is combined with a torque converter fitted with a direct coupled clutch;

conducting downshifting operations with the direct coupled clutch of the torque converter kept in an engaged condition when said second shifting condition occurs; and conducting speed ratio change operations with the direct coupled clutch kept in a released condition in all cases where the second shifting condition does not occur.

3. A method of controlling speed ratio changes in a hydraulically actuated type multiple-stage speed ratio change gear as claimed in claim 1, further including the steps of:

providing a controller which controls speed ratio changes in accordance with predetermined instructions and performs the sub-steps of:

providing a speed ratio change command based on signals input to said controller including a speed stage signal from a gear shifting lever, an engine speed signal from an engine revolution sensor from which vehicle speed is determined, an accelerator OFF signal from an acceleration sensor, a brake OFF signal from a brake pedal, a speed ratio change gear input revolution signal, an intermediate shaft revolution signal, and an output revolution signal;

determining when said first shifting condition occurs;

determining when said predetermined shifting conditions are met as required by the predetermined instructions;

outputting said speed change command after the lapse of said first shift inhibiting time when said first shifting condition occurs; and outputting said speed change command after the lapse of said second inhibiting time when said first shifting condition does not occur.

* * * * *